(12) United States Patent
Xiong et al.

(10) Patent No.: US 8,823,879 B2
(45) Date of Patent: Sep. 2, 2014

(54) TV FEATURE HIGHLIGHT

(75) Inventors: True Xiong, San Diego, CA (US);
Prisciliano Flores, Spring Valley, CA (US)

(73) Assignee: Sony Corporation, Tokyo (JP)

( * ) Notice: Subject to any disclaimer, the term of this patent is extended or adjusted under 35 U.S.C. 154(b) by 666 days.

(21) Appl. No.: 12/590,676

(22) Filed: Nov. 12, 2009

(65) Prior Publication Data
US 2011/0109800 A1    May 12, 2011

(51) Int. Cl.
| | |
|---|---|
| *H04N 5/50* | (2006.01) |
| *H04N 21/4402* | (2011.01) |
| *H04N 21/478* | (2011.01) |
| *H04N 21/485* | (2011.01) |
| *H04N 21/488* | (2011.01) |
| *H04N 21/434* | (2011.01) |
| *H04N 21/431* | (2011.01) |

(52) U.S. Cl.
CPC ......... *H04N 5/50* (2013.01); *H04N 21/440263* (2013.01); *H04N 21/478* (2013.01); *H04N 21/485* (2013.01); *H04N 21/4882* (2013.01); *H04N 21/4345* (2013.01); *H04N 21/4316* (2013.01)
USPC ............................. 348/732; 348/563; 348/569

(58) Field of Classification Search
USPC ......... 348/731–733, 725, 653–569, 553–555, 348/570; 725/38, 40, 68, 72, 69, 56–57, 53, 725/59; 455/161.3, 154.1, 154.2, 159.1
See application file for complete search history.

(56) References Cited

U.S. PATENT DOCUMENTS

| | | | | |
|---|---|---|---|---|
| 4,685,065 | A * | 8/1987 | Braun et al. | 702/76 |
| 6,115,080 | A * | 9/2000 | Reitmeier | 348/731 |
| 6,317,877 | B1 | 11/2001 | Hoffman, Jr. et al. | |
| 6,477,705 | B1 * | 11/2002 | Yuen et al. | 725/41 |
| 7,286,190 | B2 * | 10/2007 | Klopfenstein et al. | 348/569 |
| 8,056,102 | B2 * | 11/2011 | Lee | 725/56 |
| 8,321,888 | B2 * | 11/2012 | Epstein et al. | 725/32 |
| 2004/0123325 | A1 * | 6/2004 | Ellis et al. | 725/91 |
| 2006/0253874 | A1 * | 11/2006 | Stark et al. | 725/62 |
| 2007/0033624 | A1 * | 2/2007 | Oh | 725/100 |
| 2008/0109851 | A1 * | 5/2008 | Heather et al. | 725/60 |
| 2008/0208842 | A1 * | 8/2008 | Jeon | 707/5 |
| 2008/0263597 | A1 * | 10/2008 | Iki et al. | 725/43 |
| 2009/0153736 | A1 | 6/2009 | Mortensen | |

* cited by examiner

*Primary Examiner* — Trang U Tran
(74) *Attorney, Agent, or Firm* — Miller Patent Services; Jerry A. Miller

(57) ABSTRACT

A method carried out on a television receiver device involves at a television receiver/tuner device, carrying out a channel scan to identify available television channels that can be received by the television receiver device; while the channel scan is being carried out: reading a feature highlight video file from a memory; and displaying the feature highlight video file on a television display. This abstract is not to be considered limiting, since other embodiments may deviate from the features described in this abstract.

35 Claims, 4 Drawing Sheets

TV FEATURE HIGHLIGHT

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The television (TV) has undergone many changes in the last several years. As conversion to digital and high definition broadcasts takes place, customers will be storming the market for a new TV set. Many will be consumers accustomed to simple conventional analog TV sets and will receive a culture shock when they see what the TV's of today (and tomorrow) are capable of. Many users don't like to read manuals. Others see certain features of the TV as too complicated to figure out, and may avoid a specific feature altogether.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
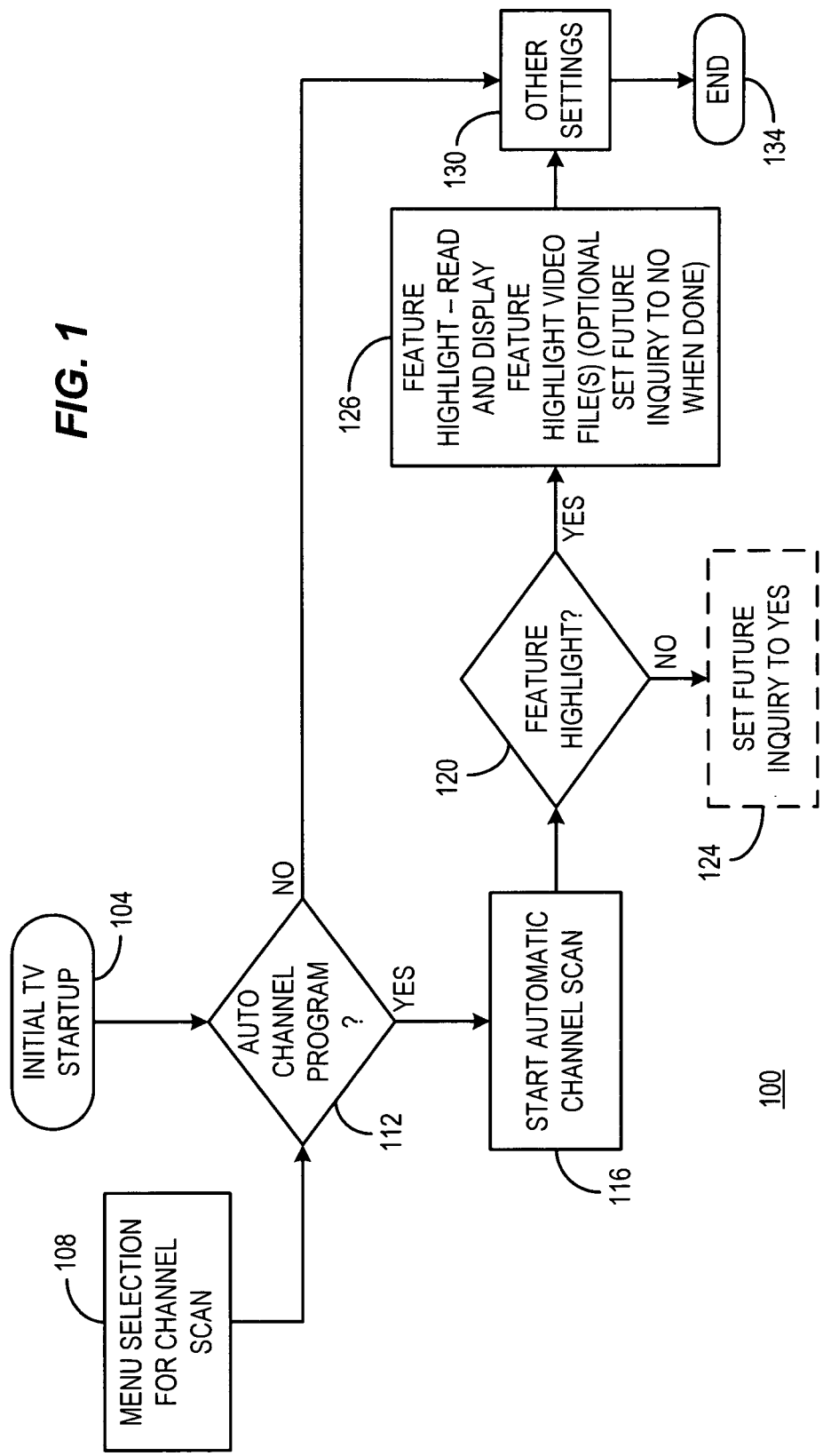
FIG. 1 is an example of flow chart depicting a process consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

With the rapidly increasing complexity and higher levels of functionality being provided via television devices, a better mechanism is needed to assist users in adapting to the rapidly increasing complexity and functionality. As a result of the high degree of reliability of television sets, those who purchase new television sets today may not have had need to do so for ten years or more. For such users, the changes can be profound. In addition to control over various levels of definition and varying home theater audio standards, the new user may have to adapt to personal video recorder (PVR) operation, extensive menu driven functionality, new improved menu systems, pay per view and Internet protocol television (IPTV) channels.

In accord with certain example implementations consistent with the present invention, a "Feature Highlight" can be used to showcase new generations of TV's most exciting, and newest features as well as educating TV users how to use them. The "Feature Highlight" can overlay the "Auto Program" function used to identify TV channels in order to showcase a new TV's capabilities, or can be merged into the same application layer with the "auto program" For example, the screen can be split into two parts—one for "auto program" and one for "Feature Highlight". Other variations will occur to those skilled in the art upon consideration of the present teachings. The "Auto Program" process can take between roughly 15 and 30 minutes to complete. During this time, a new TV owner may simply be wasting time watching a progress bar increment and noting how many channels have been found. This throw-away time can be used to engage and educate users about their new TV and its new features while simultaneously enhancing the user's experience during the auto program function.

TV manufactures are anxious to try to differentiate their TV from other competitions by focusing on software to develop and integrate new exciting features and rich graphic applications such as the Background TV, Guide, Music/photo/video player with visualizers, Favorites (NSX), IPTV, Widgets and other features. Yet, traditional users often have no little knowledge or expectation of the existence of these software features. The "Feature Highlight" can assist by showcasing these new features and make the TV experience richer for the user. The "Feature Highlight" can showcase the new features as well as give tutorials on how to use the new features. The "Auto Program" function which can run from about 15 to 30 minutes thus far does not offer any means to enrich the user experience with a blue screen and wait time. The "Auto Program" time can be effectively utilized to highlight and educate user about new exciting features/applications/technologies. This can potentially excite the user about a TV's new features and encourage the new user to try them out.

In accord with certain example embodiments, at the start of an "Auto Program" routine, a light application will partially overlay (note that the "Feature Highlight" need not be implemented as an overlay, the screen can be split into two screens where "Feature Highlight" can be placed left, top, right or bottom and "auto program" status on another side or the opposite side of "Feature Highlight") the display in the foreground. The foreground/split "Feature Highlight" application (top, left, right or bottom) will start to highlight the TV's new features, applications, and technologies individually at a slow pace allowing users to absorb the information. The application should preferably be timed to last for a time shorter than the anticipated shortest channel scan time. This application can be either a passive video player, or an active or interactive user participation experience as desired. During each feature, application or technology highlight, a small tutorial can show user how to use each particular highlighted feature using the remote control or show the user how to set it up. An example of such a tutorial is the media application which can access media files (photo, music, video) via USB and DLNA server which may have many interesting visualizers. Accessing media files via a USB device maybe straight forward. However, setting up a DLNA server may seem complicated to some. In this case, this tutorial can show user how to set up a DNLA server (Twonky™, Windows Media Player™, etc.) in order to fully utilize the media application.

The "Features Highlight" can enhance the user's experience during "Auto Program" by engaging him/her with information on the TV's new features, applications and technologies. In a practical case, a user would otherwise be likely to just stare at the current screen (e.g., a blue screen) and wait for "Auto Program" to finish before moving forward with the TV Setup process. In approximately 17 minutes, which typical for how long it takes for the "Auto Program" routine to complete, a user could learn what are the TV's new features, applications and technologies and how to use them.

In certain example implementations, if user chooses to skip "Auto Program", a message box will appear to ask if user want to see the "Features Highlight". If user chooses to see the "Features Highlight", the same "Features Highlight" application will start and take user through the showcase and tutorial.

Turning now to FIG. 1, an example implementation of a process consistent with certain embodiments is depicted as process 100 starting at 104 with an initial TV startup (or other initialization). The process could also be started by selection of a channel scan selection from the TV's menu system at 108. In either case, the TV begins an automatic channel scan which systematically scans the various TV inputs for available TV channels if selected at 112. This channel scan starts at 116 and proceeds to walk through the channel scanning process in a more or less conventional manner.

Once the scan begins (or prior to beginning), the user can opt in or out of the "Feature Highlight" function at 120 by making a selection using the TV remote controller or any other control operation using any suitable user interface initiated by the user. In one implementation, if the user opts out at 120, a flag is set in the TV to inquire again next time a channel scan is implemented, while in other implementations, the channel scan can be made a standard part of the process without an opt out option or with other variations which will occur to those skilled in the art upon consideration of the present teachings.

When the "Feature Highlight" function is invoked at 120, the "Feature Highlight" function begins at 126 while the channel scan operation is running. In one implementation, the query can be disabled on a subsequent channel scan as shown at 124, or the "Feature Highlight" can be invoked each time the channel is scanned, obviating need for the query at 120. When the channel scan has been completed and the "Feature Highlight" process is completed, the setup process may continue at 130 to permit users to set other settings until completed at 134.

Figure 2:
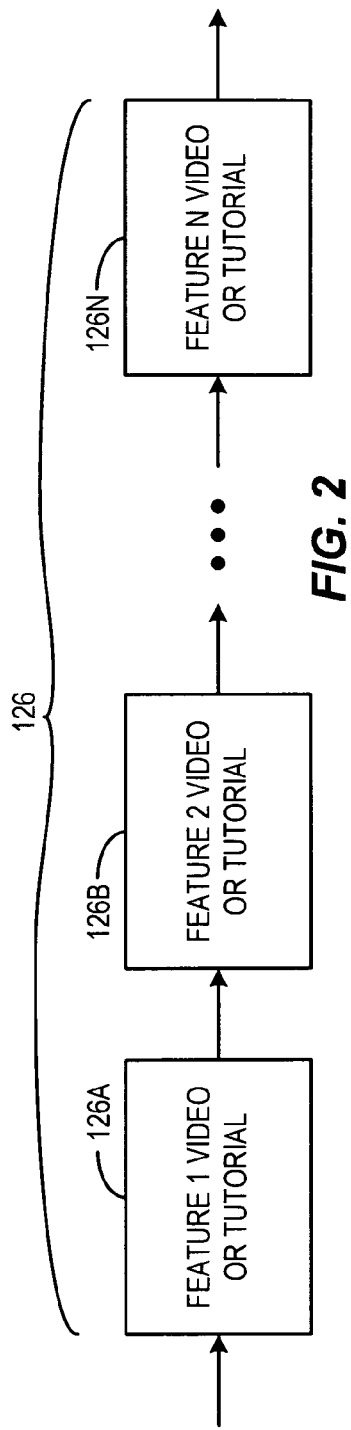
FIG. 2 is an example flow chart showing a sequence of videos or tutorials consistent with certain embodiments of the present invention.

When the TV is set up as described above, the viewer will have had the opportunity to view passive videos explaining operation of the various TV features, or in another implementation may be taken through an active or interactive process of learning about the features of the TV as desired by the "Feature Highlight" designers. In one example implementation, the "Feature Highlight" process is depicted in FIG. 2 wherein an example sequence of N videos 126A, 126B through 126N are presented to the user for passive viewing during the auto-programming process. In other implementations, the sequence can utilize video, still images, animations, animated GIFs, embedded application such as Flash applications, text or any other form of content that is suitable to provide information to the user regarding the device's features. In other implementations, the user can actively select what "Feature Highlight" segments to view or may be able to select desired passive or interactive tutorials without departing from embodiments consistent with the present invention.

Figure 3:
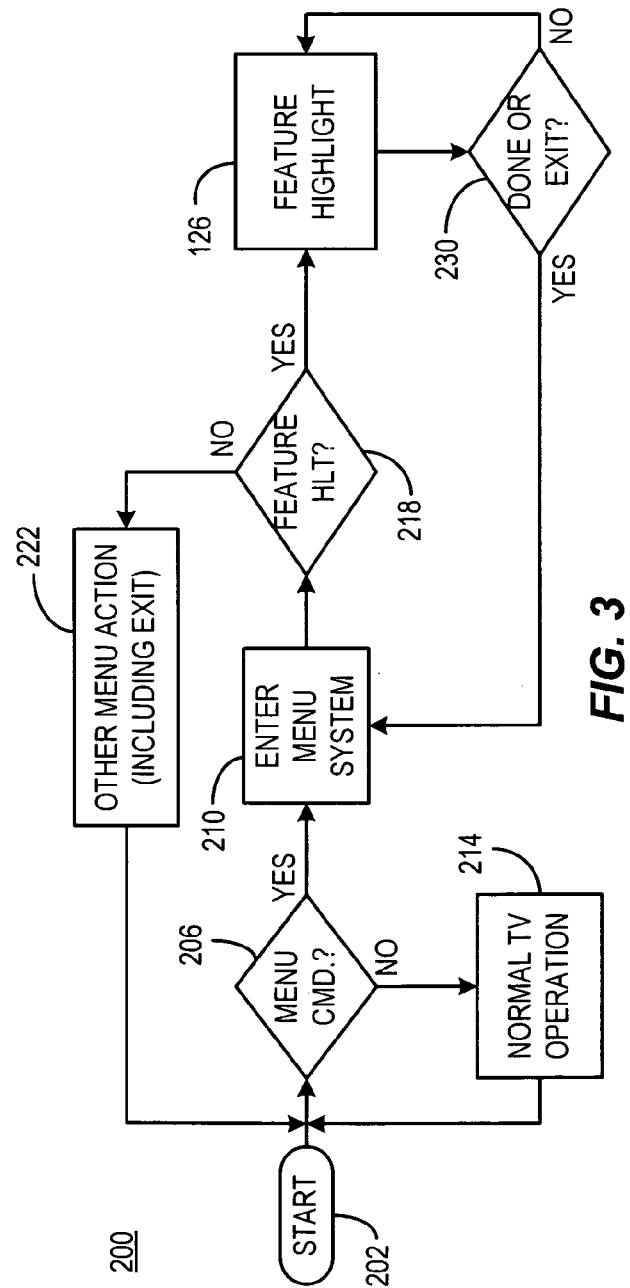
FIG. 3 is an example flow chart of another embodiment of a process consistent with certain embodiments of the present invention.

FIG. 3 depicts an additional implementation process 200 wherein the viewer can actively select to engage in the "Feature Highlight" process. This permits viewers who might not have been present to learn about the TV's features and allows multiple views of the "Feature Highlights". The "Feature Highlights" can be stored as video files in the passive embodiments in memory of the TV, or can be stored as program code coupled with video or still images in interactive and active tutorial implementations.

In accord with example process 200 starting at 202, the user can invoke a menu command from the remote controller at 206 in order to bring up a menu system such as a cross-media bar menu system at 210. Other normal TV operations are provided when the menu is exited at 214. From the menu system, the user can enter a "Feature Highlight" command (preferably from a setup sub-menu) at 218 which invokes the "Feature Highlight" function 126. If "Feature Highlight" is not selected at 218, other menu actions can be invoked and carried out (including exiting the menu system) at 222 which returns the user to either the menu system or to normal TV operation. When the "Feature Highlight" is invoked, the user may exit at will or exit when the videos or tutorials are complete at 230 which either returns the user to the menu system at 210 or to normal TV operation at 214. The menu system may be any suitable menu system including, but not limited to a cross media bar (XMB) menu system.

Figure 4:
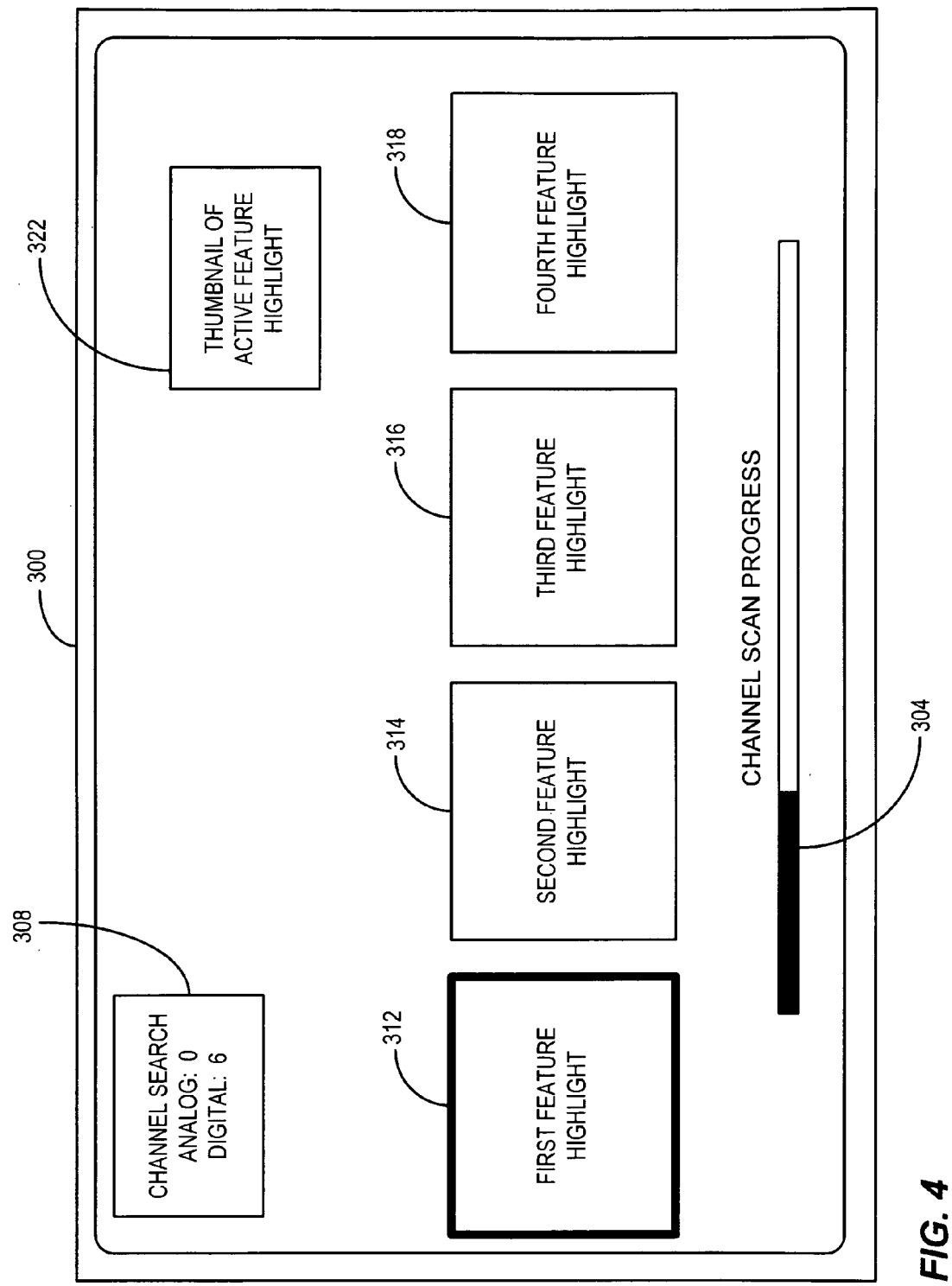
FIG. 4 is a simulated screen shot of an example implementation consistent with certain embodiments of the present invention.

FIG. 4 depicts one arrangement for the "Feature Highlight" carried out during a channel setup operation as described above. In this implementation, the TV display 300 includes a progress bar 304 (in this example at the bottom of the display) which roughly tells the user how far through the channel search process the TV is at any given time. Additionally, the channel search status in the form of number of channels of a particular type (e.g., analog and digital) can be displayed at window 308 (in this example at the upper left of the display) so the user can further understand the progress of the channel search. "Feature Highlight" windows in this example are arranged horizontally along a row depicting a number of "Feature Highlight" videos or tutorials 312, 314, 316 and 318 (fewer or more could be shown with additional features scrolling from off the screen to on screen as needed). In this example, the feature that is currently playing is shown highlighted (in this case 312) for example by a bold or differently colored (e.g., yellow) border. The "Feature Highlight" windows 312-318 are shown across the lower center of the display in this example, but could be centered or otherwise arranged. Additionally, the active "Feature Highlight" is represented by a thumbnail image 322 or other identifier on the screen that identifies the currently playing "Feature Highlight" video or tutorial, in this case at the upper left. Identification can be by text, icon or video still. In other embodiments, a small array of thumbnails could be used to represent the features and a single large window can display the actual "Feature Highlight". Other arrangements including differing locations for the various video image components will occur to those skilled in the art upon consideration of the present teachings.

Figure 5:
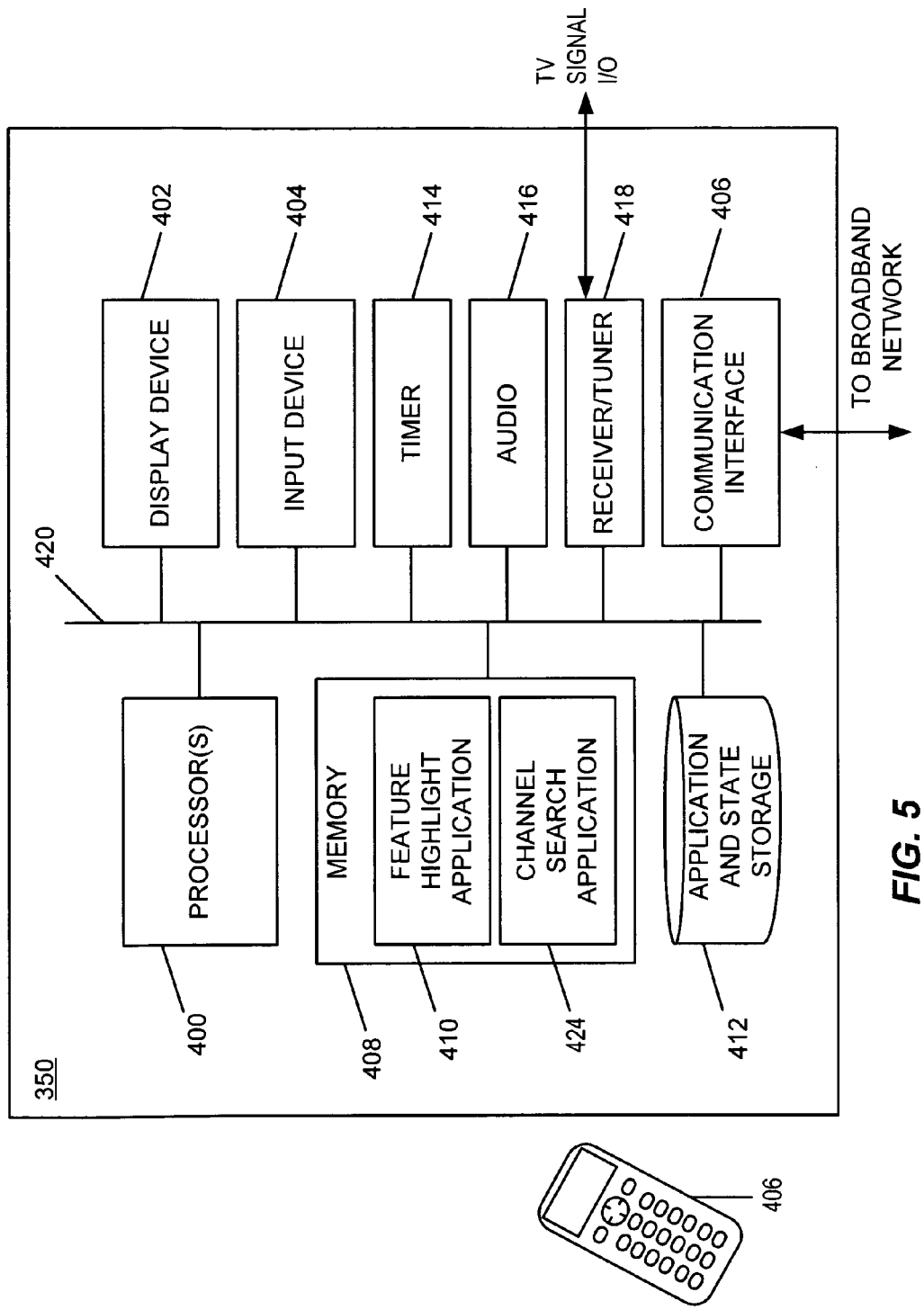
FIG. 5 is an example TV system implementation consistent with certain embodiments of the present invention.

FIG. 5 is a block diagram of an example of an implementation of the TV 350 that implements the "Feature Highlight" functions described above. In certain implementations, the TV 350 is enabled to receive programming via any of a variety of media including, but not limited to, broadcast television signals, cable television signals, and Internet television programming via Internet Protocol (IPTV). A processor 400 provides computer instruction execution, computation, and other capabilities within the TV 350. A display device 402 provides visual and/or other information to a user of the TV 350. The display device 402 includes a display screen and display interface circuitry (not shown for ease of illustration purposes) and presents visual representations of content as well as on screen display information associated with the "Feature Highlight" functions and applications. The display device 402 may include any type of display device, such as a cathode ray tube (CRT), liquid crystal display (LCD), light emitting diode (LED), projection or other display element or panel. An input device 404 provides input capabilities for the user. The input device 404 may include a mouse, pen, trackball, or other input device. The input device 404 may further include circuitry for receiving input from the TV remote control device 406, such as infrared receiver circuitry. One or more input devices, such as the input device 404, may be used.

A communication interface 406 encapsulates and provides communication capabilities for interaction with web-based servers and the Internet via wired or wireless network connection. It should be noted that the communication interface 406 is illustrated as a component-level module for ease of illustration and description purposes. It is also understood that the communication interface 406 includes any hardware, programmed processor(s), and memory used to carry out the functions of the communication interface 406 as described above and in more detail below. For example, the communication interface 406 may include additional controller circuitry in the form of application specific integrated circuits (ASICs), processors, and/or discrete integrated circuits and components for performing electrical control activities associated with the communication interface 406. Additionally, the communication interface 406 also includes interrupt-level, stack-level, and application-level modules as appropriate. Furthermore, the communication interface 406 includes any memory components used for storage, execution, and data processing by these modules for performing processing activities associated with the communication interface 406. The communication interface 406 may also form a portion of other circuitry described below without departure from the scope of the present subject matter.

A memory 408 includes the "Feature Highlight" application 410, which is integrated with or called by the setup process as well as possibly the menu system. The "Feature Highlight" application 410 is executable in association with the TV 350 to allow user interaction with the "Feature Highlight" application 410.

The "Feature Highlight" application 410 includes instructions executable by the processor 400 for performing the functions described broadly above. The "Feature Highlights" application 410 may form a portion of an interrupt service routine (ISR), a portion of an operating system, or a portion of a separate application without departure from the scope of the present subject matter. Any firmware associated with a programmed processor that forms a portion of the "Feature Highlight" application 410 may be stored within, executed from, and use data storage space within the memory 408 and/or 412 without departure from the scope of the present subject matter.

It is understood that the memory 408 may include any combination of volatile and non-volatile memory suitable for the intended purpose (e.g., Random Access Memory, Read Only Memory, Flash Memory, etc.), distributed or localized as appropriate, and may include other memory segments not illustrated within the present example for ease of illustration purposes. For example, the memory 408 may include a code storage area, a code execution area (e.g., an operating system area and other areas for code execution), and a data area suitable for storage and execution of the "Feature Highlight" application 410 and any firmware associated with a programmed processor that forms a portion of the communication interface 406, as appropriate. It is also be understood that, though the "Feature Highlight" application and state storage information database 412 are illustrated as separate components, the "Feature Highlight" application and state information may also be stored within the memory 408 as described above without departure from the scope of the present subject matter.

A timer 414 allows timing of activities such as, among other functionality, a timing module for coordinating the channel search application 424 and display of the progress on progress bar 304 and other activities being carried out by the TV 350. An audio module 416 includes audio control and driver circuitry for providing audio output from the TV 350. A receiver/tuner module 418 includes receiver and tuner circuitry for tuning to and receiving information from designated television channels. A detailed description of the audio module 416 and the receiver/tuner module 418 is not provided herein for ease of illustration purposes. It is further noted that the above remarks regarding operation and storage of elements of the "Feature Highlight" application are equally applicable to the channel search application.

The processor (or processors) 400, the display device 402, the input device 404, the communication interface 406, the memory 408, the applications 410 and 424 and state storage information database 412, the audio module 416, and the receiver/tuner module 418 are interconnected via one or more interconnections shown as interconnection 420 for ease of illustration. The interconnection 420 may include one or more system buses, a network, or any other interconnection capable of providing the respective components with suitable interconnection for the respective purpose. Multiple special purpose or general purpose processors, including graphics processors for on-screen display and other special functions may be used to implement the functionality described above. Hence, the present illustration should be considered illustrative and not limiting on the actual hardware configuration of the TV 350. It will also be understood that while the present implementation is carried out in a television device such as TV 350, any television receiver device including a TV set top box with enhanced features could benefit from embodiments consistent with the present invention.

Thus, a method carried out on a television receiver device involves at a television receiver/tuner device, carrying out a channel scan to identify available television channels that can be received by the television receiver device; while the channel scan is being carried out: reading a feature highlight video file from a memory; and displaying the feature highlight video file on a television display. In certain implementations, the method can be carried out as part of an initial setup sequence for the television receiver device. In certain implementations, the method can be carried out as a consequence of initiation of the channel scan as a menu selection. In certain implementations, the reading and displaying of the feature highlight video file is carried out as a result of a positive user input authorizing the reading and displaying. In certain implementations, the method also involves setting a flag when the feature highlight video file has been displayed, where the flag indicates that the reading and displaying are not to be carried out during future channel scans until reset. In certain implementations, the method also involves displaying a progress bar on the display during the channel scan. In certain implementations, the method also involves displaying a channel search status window on the display during the channel scan, where the channel search status window displays a count of channels that have been identified. In certain implementations, the method also involves displaying a thumbnail identifying the feature highlight video file that is currently playing on the display during the channel scan. In certain implementations, the reading and displaying are repeated for a plurality of feature highlight video files, with each feature highlight video file depicting a different television feature. In certain implementations, the feature highlight video comprises a passive video for viewing by a viewer. In certain implementations, the feature highlight video comprises an interactive tutorial.

Another method carried out on a television receiver device involves at a television receiver/tuner device, carrying out a channel scan as part of an initial setup sequence for the television receiver device to identify available television channels that can be received by the television receiver device; displaying a progress bar on a television display during the channel scan; displaying a channel search status window on the display during the channel scan, where the channel search status window displays a count of channels that have been identified; while the channel scan is being carried out: sequentially reading a plurality of feature highlight video files from a memory; displaying the feature highlight video files on the television display; and displaying a thumbnail identifying the feature highlight video file that is currently playing on the display during the channel scan; where the reading and displaying of the feature highlight video file is carried out as a result of a positive user input authorizing the reading and displaying.

In certain implementations, the method can be carried out a subsequent time as a consequence of initiation of the channel scan as a menu selection. In certain implementations, the method also involves setting a flag when the feature highlight video file have been displayed, where the flag indicates that the reading and displaying are not to be carried out during future channel scans until the flag is reset, In certain implementations, the feature highlight video is a passive video for viewing by a viewer. In certain implementations, the feature highlight video comprises an interactive tutorial.

A television receiver device consistent with certain implementations has a control processor and a television display. A television receiver/tuner carries out a channel scan responsive to commands from the control processor to identify available television channels that can be received by the television receiver device. While the channel scan is being carried out the processor operates to read a feature highlight video file from a memory and cause the feature highlight video file to be displayed on the display.

In certain implementations, the channel scan and reading and displaying are carried out as part of an initial setup sequence for the television receiver device. In certain implementations, the channel scan, reading and displaying of the feature highlight video file are carried out as a consequence of initiation of the channel scan as a menu selection. In certain implementations, the reading and displaying of the feature highlight video file are carried out as a result of a positive user input authorizing the reading and displaying. In certain implementations, the processor sets a flag when the feature highlight video file has been displayed, where the flag indicates that the reading and displaying are not to be carried out during future channel scans until the flag is reset. In certain implementations, the processor further operates to cause a progress bar to be displayed on the display during the channel scan. In certain implementations, the processor further operates to cause a channel search status window to be displayed on the display during the channel scan, where the channel search status window displays a count of channels that have been identified. In certain implementations, the processor further operates to cause display on the display of a thumbnail identifying the feature highlight video file that is currently playing on the display during the channel scan. In certain implementations, the processor causes the reading and displaying are repeated for a plurality of feature highlight video files, with each feature highlight video file depicting a different television feature. In certain implementations, the feature highlight video comprises a passive video for viewing by a viewer. In certain implementations, the method also involves the feature highlight video comprises an interactive tutorial.

Another television receiver device has a control processor and a television display. A television receiver/tuner carries out a channel scan as a part of an initial setup sequence responsive to commands from the control processor to identify available television channels that can be received by the television receiver device. While the channel scan is being carried out the processor operates to read a feature highlight video file from a memory and cause the feature highlight video file to be displayed on the display, where the feature highlight video file comprises a passive video for viewing by a viewer. The processor further operates to cause a progress bar to be displayed on the display during the channel scan. The processor further operates to cause a channel search status window to be displayed on the display during the channel scan, where the channel search status window displays a count of channels that have been identified. The processor further operates to cause display on the display of a thumbnail identifying the feature highlight video file that is currently playing on the display during the channel scan. The processor causes the reading and displaying to be repeated for a plurality of feature highlight video files, with each feature highlight video file depicting a different television feature.

Any of the above processes can be carried out using a tangible computer readable electronic storage medium storing instructions which, when executed on one or more programmed processors.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

While certain illustrative embodiments have been described, it is evident that many alternatives, modifications, permutations and variations will become apparent to those skilled in the art in light of the foregoing description.

What is claimed is:

1. A method carried out on a television receiver device, comprising:
    at a television receiver/tuner device, carrying out a channel scan to identify available television channels that can be received by the television receiver device;
    while the channel scan is being carried out:
        reading a feature highlight video file from a memory;
        where the feature highlight video file contains a video tutorial explaining use of a feature operable on the television receiver device;
        displaying the video tutorial stored in the feature highlight video file on a television display; and
        setting a flag when the feature highlight video file has been displayed, where the flag indicates that the reading and displaying are not to be carried out during future channel scans until reset.

2. The method according to claim 1, carried out as part of an initial setup sequence for the television receiver device.

3. The method according to claim 1, carried out as a consequence of initiation of the channel scan as a menu selection.

4. The method according to claim 1, wherein the reading and displaying of the feature highlight video file is carried out as a result of a positive user input authorizing the reading and displaying.

5. The method according to claim 1, further comprising displaying a progress bar on the display during the channel scan.

6. The method according to claim 1, further comprising displaying a channel search status window on the display during the channel scan, where the channel search status window displays a count of channels that have been identified.

7. The method according to claim 1, further comprising displaying a thumbnail identifying the feature highlight video file that is currently playing on the display during the channel scan.

8. The method according to claim 1, wherein the reading and displaying are repeated for a plurality of feature highlight video files, with each feature highlight video file depicting a different television feature.

9. The method according to claim 1, wherein the feature highlight video comprises a passive video for viewing by a viewer.

10. The method according to claim 1, wherein the feature highlight video comprises an interactive tutorial.

11. A tangible non-transitory computer readable electronic storage medium storing instructions which, when executed on one or more programmed processors, carry out a method according to claim 1.

12. A method carried out on a television receiver device, comprising:
    at a television receiver/tuner device, carrying out a channel scan as part of an initial setup sequence for the television receiver device to identify available television channels that can be received by the television receiver device;
    displaying a progress bar on a television display during the channel scan;
    displaying a channel search status window on the display during the channel scan, where the channel search status window displays a count of channels that have been identified;
    while the channel scan is being carried out:
        sequentially reading a plurality of feature highlight video files from a memory;
        where the plurality of feature highlight video files contain video tutorials explaining use of features operable on the television receiver device;
        displaying the feature highlight video files on the television display;
        setting a flag when the feature highlight video file has been displayed, where the flag indicates that the reading and displaying are not to be carried out during future channel scans until reset; and
        displaying a thumbnail identifying the feature highlight video file that is currently playing on the display during the channel scan;
    where the reading and displaying of the feature highlight video file is carried out as a result of a positive user input authorizing the reading and displaying.

13. The method according to claim 12, carried out a subsequent time as a consequence of initiation of the channel scan as a menu selection.

14. The method according to claim 12, wherein the feature highlight video comprises a passive video for viewing by a viewer.

15. The method according to claim 12, wherein the feature highlight video comprises an interactive tutorial.

16. A television receiver device, comprising:
    a control processor;
    a television display;
    a television receiver/tuner that carries out a channel scan responsive to commands from the control processor to identify available television channels that can be received by the television receiver device;
    while the channel scan is being carried out, the processor operating to read a feature highlight video file from a memory and cause the feature highlight video file to be displayed on the display, where the feature highlight video file contains a video tutorial explaining use of a feature operable on the television receiver device; and where the control processor sets a flag when the feature highlight video file has been displayed, where the flag indicates that the reading and displaying are not to be carried out during future channel scans unless the flag is reset.

17. The television receiver device according to claim 16, where the channel scan and reading and displaying are carried out as part of an initial setup sequence for the television receiver device.

18. The television receiver device according to claim 16, where the channel scan, reading and displaying of the feature highlight video file are carried out as a consequence of initiation of the channel scan as a menu selection.

19. The television receiver device according to claim 16, wherein the reading and displaying of the feature highlight video file are carried out as a result of a positive user input authorizing the reading and displaying.

20. The television receiver device according to claim 16, where the processor further operates to cause a progress bar to be displayed on the display during the channel scan.

21. The television receiver device according to claim 16, where the processor further operates to cause a channel search status window to be displayed on the display during the channel scan, where the channel search status window displays a count of channels that have been identified.

22. The method according to claim 16, where the processor further operates to cause display on the display of a thumbnail identifying the feature highlight video file that is currently playing on the display during the channel scan.

23. The television receiver device according to claim 16, wherein the processor causes the reading and displaying are repeated for a plurality of feature highlight video files, with each feature highlight video file depicting a different television feature.

24. The television receiver device according to claim 16, wherein the feature highlight video comprises a passive video for viewing by a viewer.

25. The television receiver device according to claim 16, wherein the feature highlight video comprises an interactive tutorial.

26. A television receiver device, comprising:
a control processor;
a television display;
a television receiver/tuner that carries out a channel scan as a part of an initial setup sequence responsive to commands from the control processor to identify available television channels that can be received by the television receiver device;
while the channel scan is being carried out the processor operating to read a feature highlight video file from a memory and cause the feature highlight video file to be displayed on the display, where the feature highlight video file comprises a passive video for viewing by a viewer;
where the passive video comprises a video tutorial explaining use of a feature operable on the television receiver device;
the processor further operating to cause a progress bar to be displayed on the display during the channel scan;
the processor further operating to cause a channel search status window to be displayed on the display during the channel scan, where the channel search status window displays a count of channels that have been identified;
the processor further operating to cause display on the display of a thumbnail identifying the feature highlight video file that is currently playing on the display during the channel scan;
wherein the processor causes the reading and displaying to be repeated for a plurality of feature highlight video files, with each feature highlight video file depicting a different television feature; and
where the processor sets a flag when the feature highlight video file has been output, where the flag indicates that the reading and output are not to be carried out during future channel scans unless the flag is reset.

27. A television receiver device, comprising:
a control processor;
a television receiver/tuner that carries out a channel scan responsive to commands from the control processor to identify available television channels that can be received by the television receiver device;
while the channel scan is being carried out, the processor operating to read a feature highlight video file from a memory and generating a signal including the feature highlight video file to be output for display, where the feature highlight video file contains a video tutorial explaining use of a feature operable on the television receiver device; and
where the processor sets a flag when the feature highlight video file has been output, where the flag indicates that the reading and output are not to be carried out during future channel scans unless the flag is reset.

28. The television receiver device according to claim 27, where the channel scan and reading and output are carried out as part of an initial setup sequence for the television receiver device.

29. The television receiver device according to claim 27, where the channel scan, reading and output of the feature highlight video file are carried out as a consequence of initiation of the channel scan as a menu selection.

30. The television receiver device according to claim 27, wherein the reading and output of the feature highlight video file are carried out as a result of a positive user input authorizing the reading and displaying.

31. The television receiver device according to claim 27, where the processor further operates to cause a progress bar to be displayed on the display during the channel scan.

32. The television receiver device according to claim 27, where the processor further operates to cause a channel search status window to be output for display during the channel scan, where the channel search status window includes a count of channels that have been identified.

33. The television receiver device according to claim 27, wherein the processor causes the reading and outputting are repeated for a plurality of feature highlight video files, with each feature highlight video file depicting a different television feature.

34. The television receiver device according to claim 27, wherein the feature highlight video comprises a passive video for viewing by a viewer.

35. The television receiver device according to claim 27, wherein the feature highlight video comprises an interactive tutorial.

* * * * *